R. F. HALL.
MANUFACTURE OF GLASS ARTICLES.
APPLICATION FILED JAN. 15, 1919.
1,393,118.
Patented Oct. 11, 1921.
8 SHEETS—SHEET 1.
Fig.1.A.
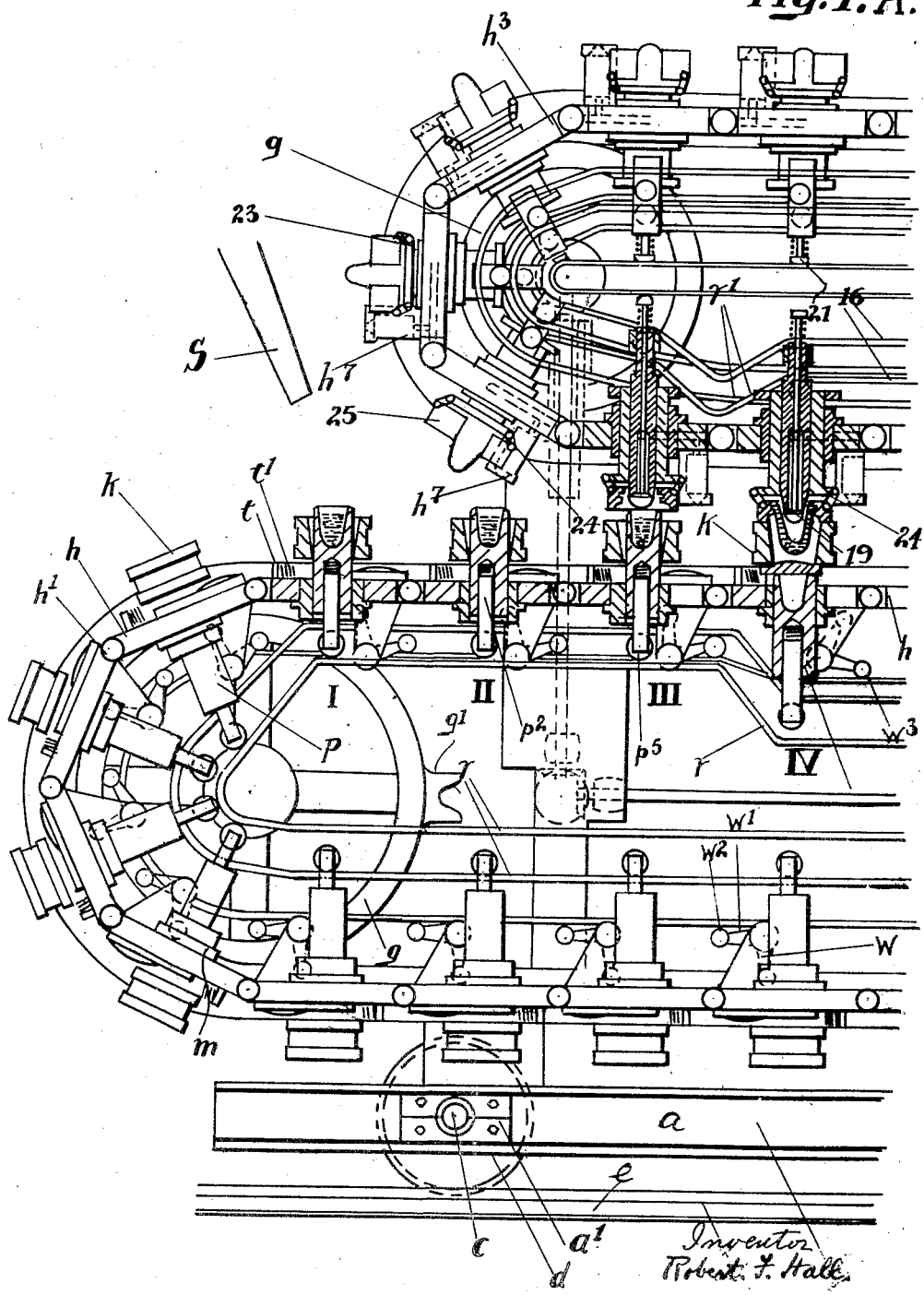

R. F. HALL.
MANUFACTURE OF GLASS ARTICLES.
APPLICATION FILED JAN. 15, 1919.
1,393,118.
Patented Oct. 11, 1921.
8 SHEETS—SHEET 2.
Fig. 1.B.
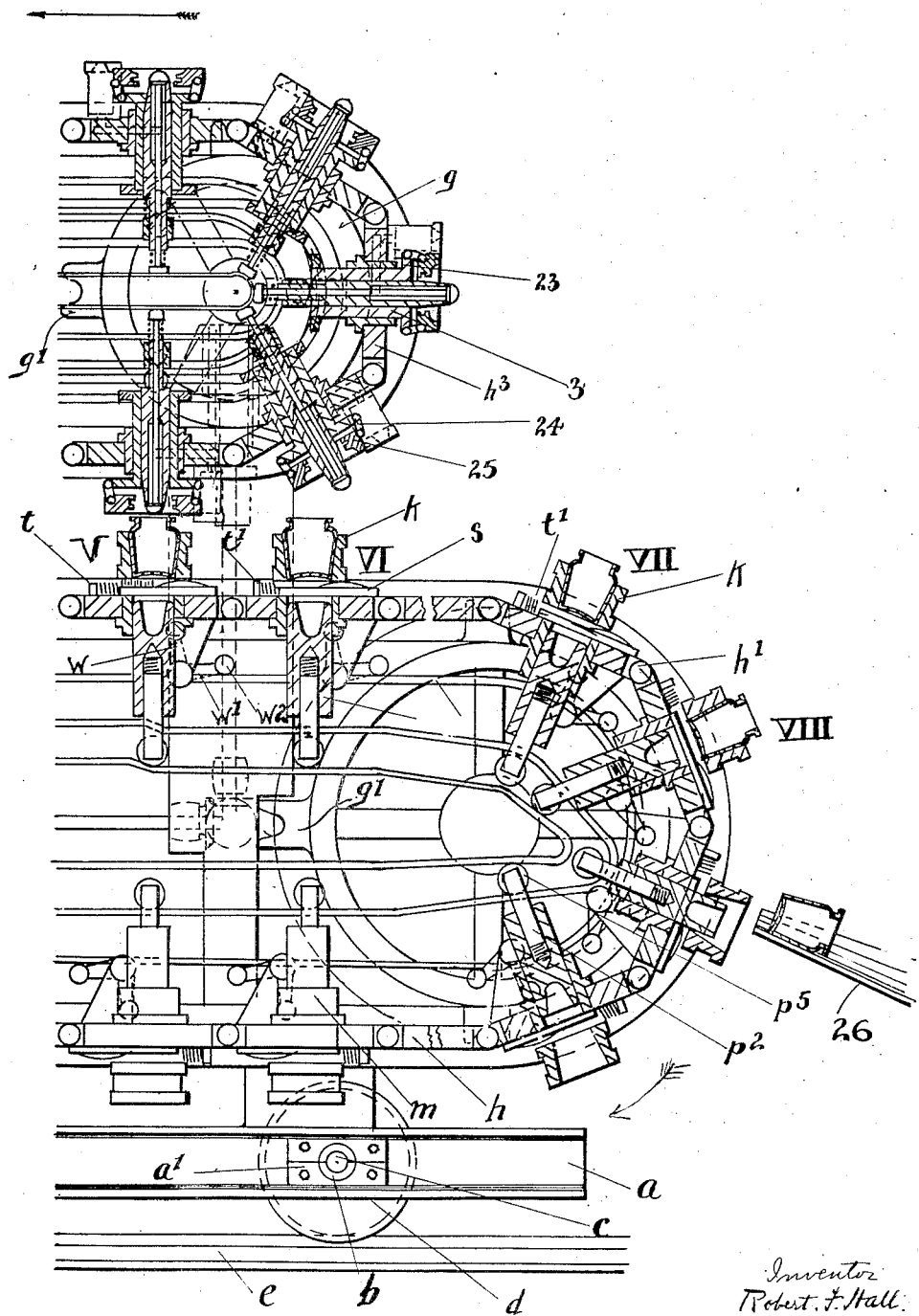
Inventor
Robert F. Hall

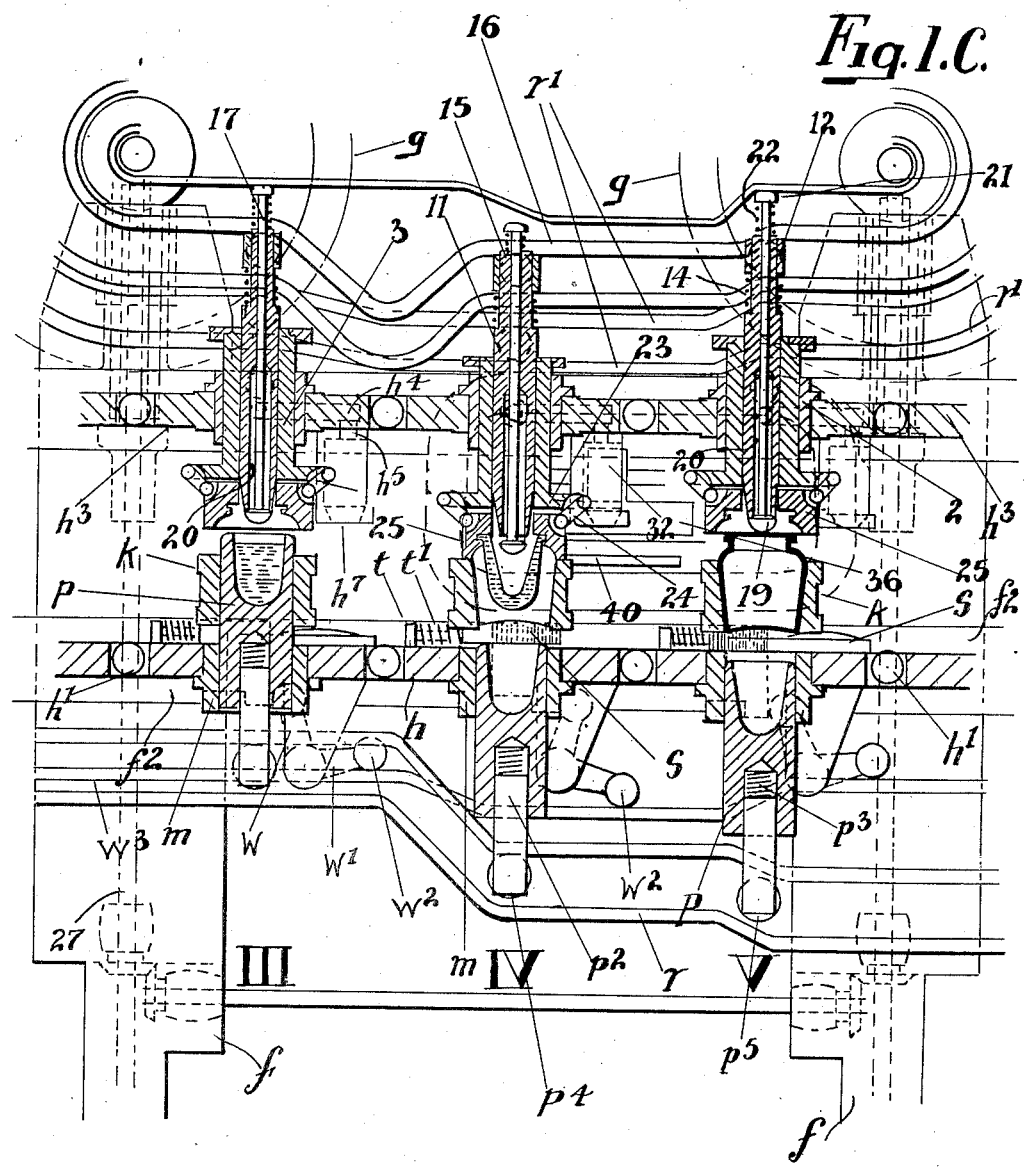
Fig. 1.C.

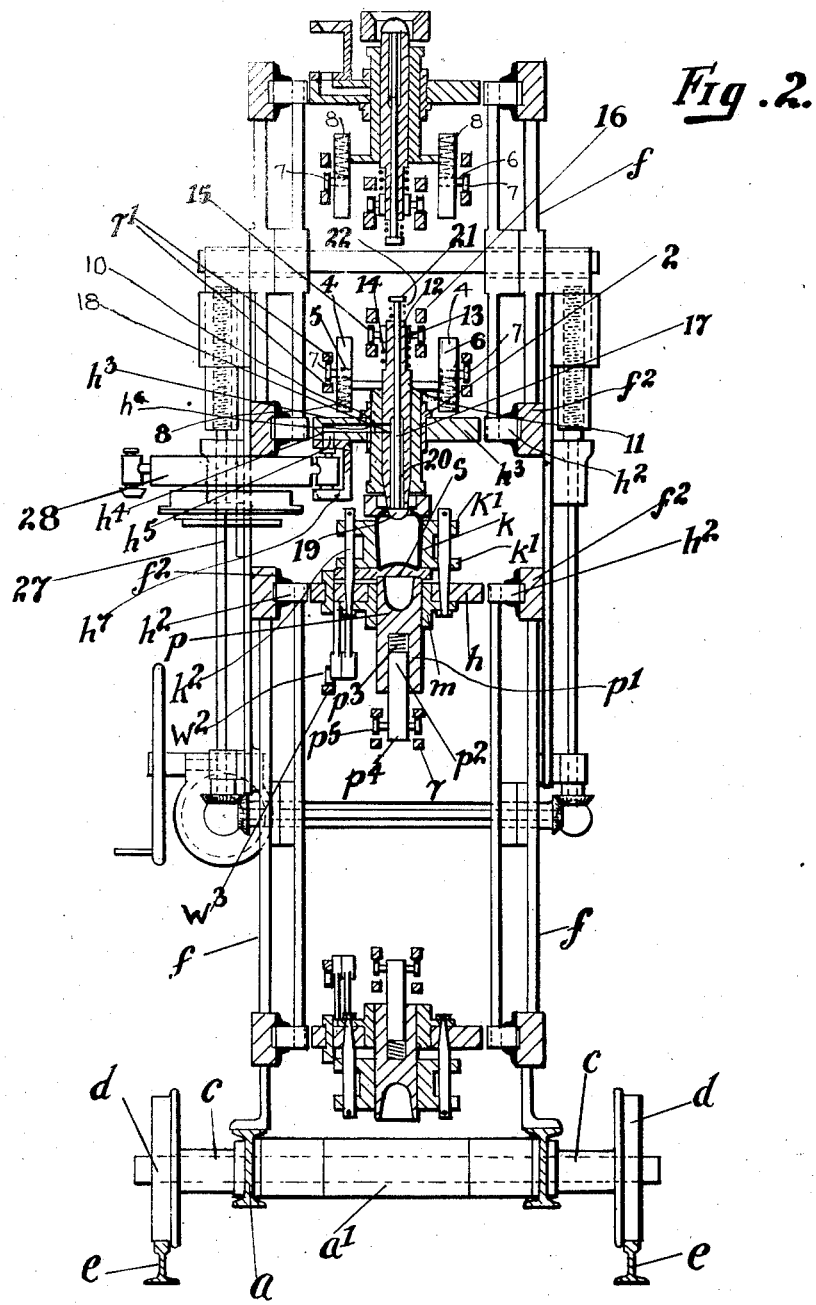

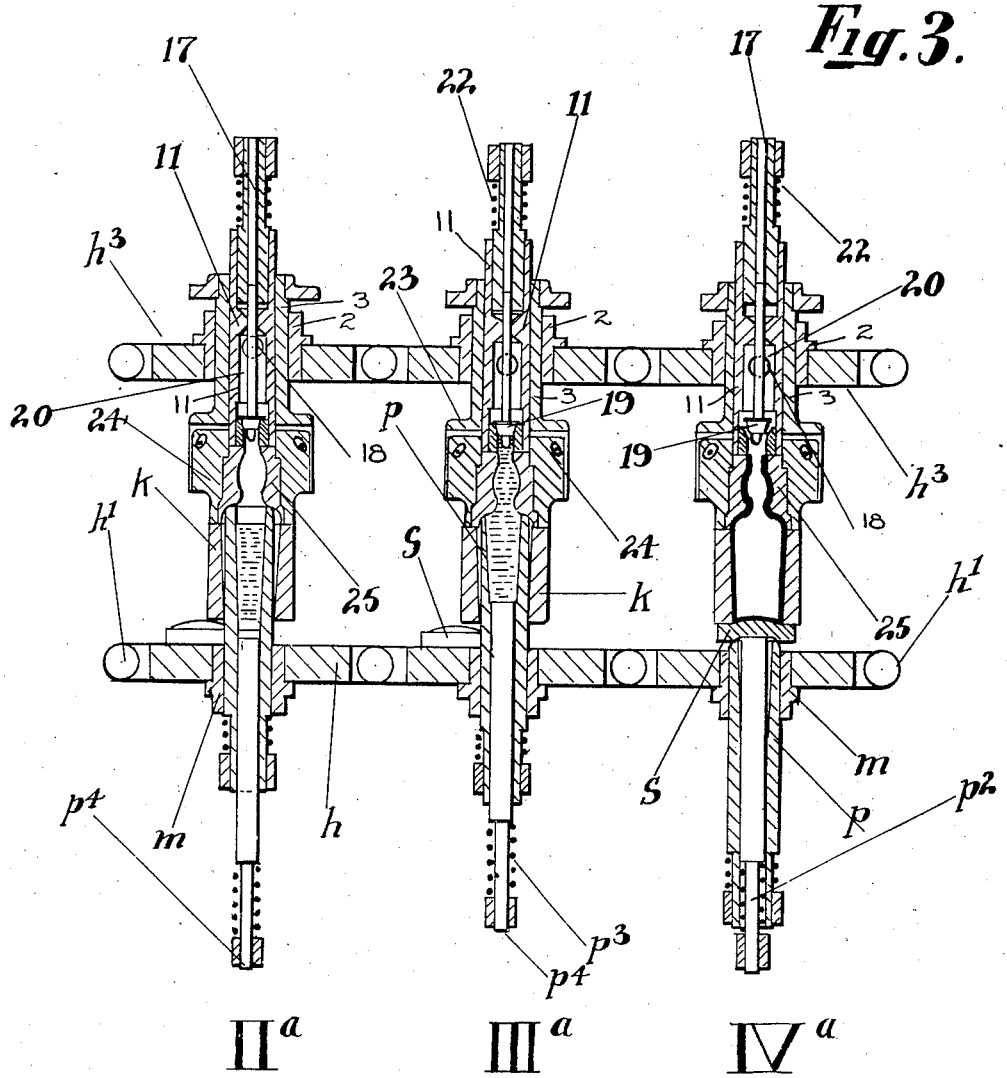

R. F. HALL.
MANUFACTURE OF GLASS ARTICLES.
APPLICATION FILED JAN. 15, 1919.

1,393,118.

Patented Oct. 11, 1921.

Inventor
Robert F. Hall.

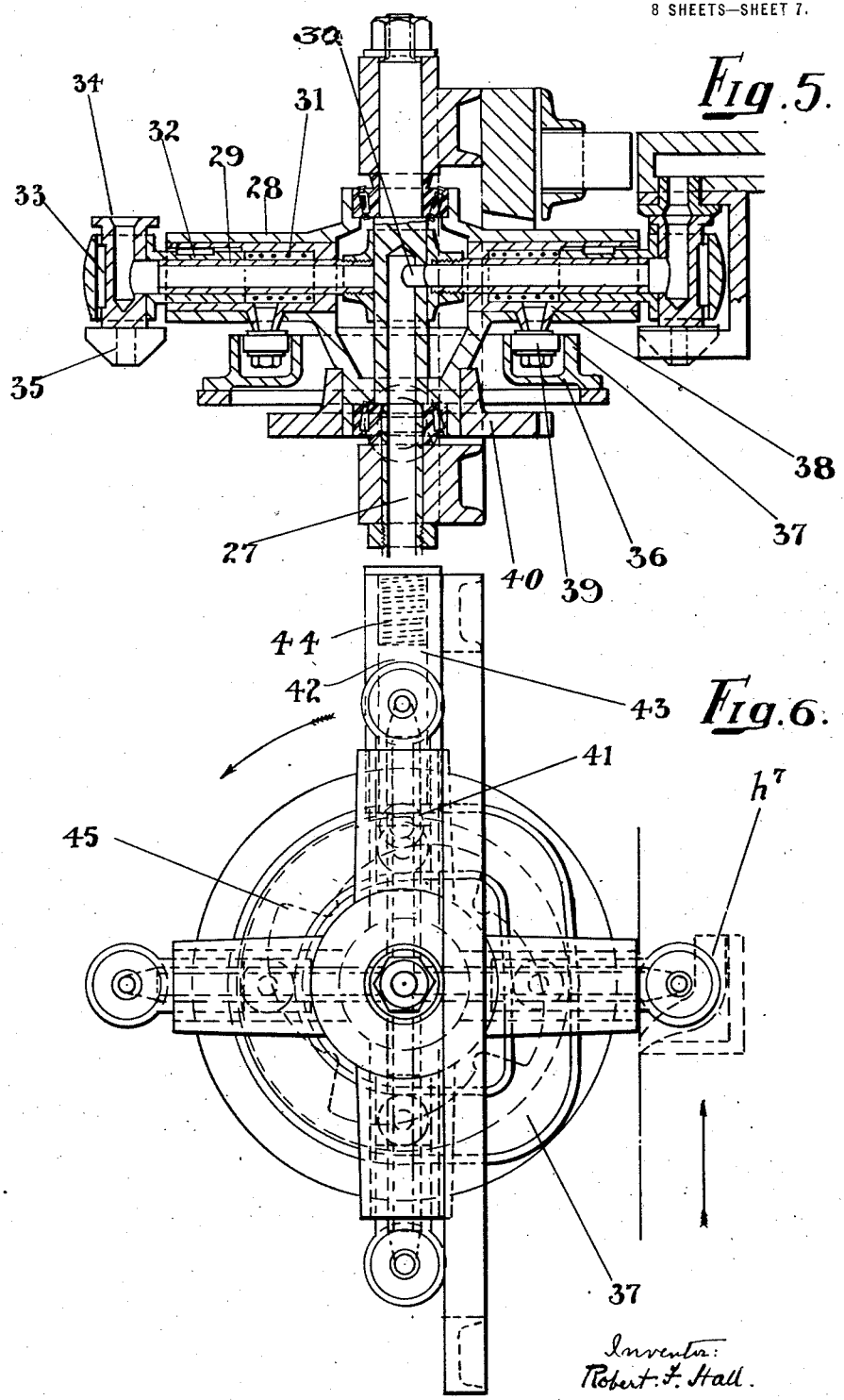

R. F. HALL.
MANUFACTURE OF GLASS ARTICLES.
APPLICATION FILED JAN. 15, 1919.
1,393,118.
Patented Oct. 11, 1921.
8 SHEETS—SHEET 8.
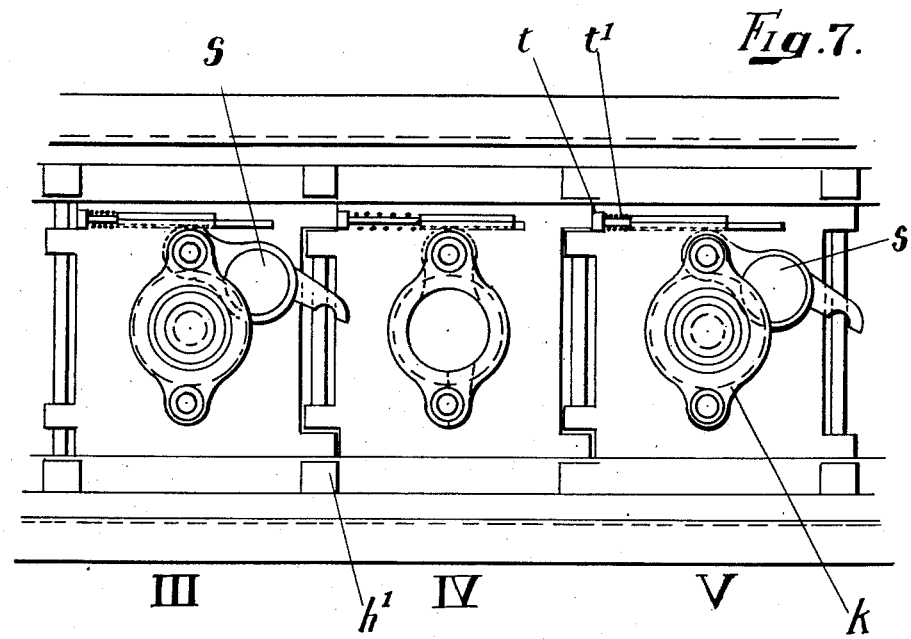
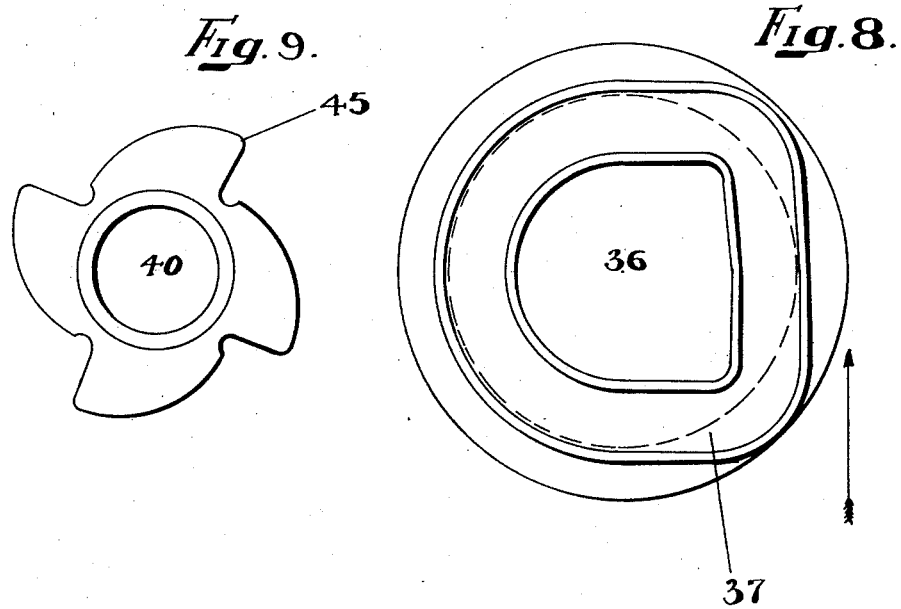
Inventor:
Robert F. Hall.

UNITED STATES PATENT OFFICE.

ROBERT FREDERICK HALL, OF BIRMINGHAM, ENGLAND.

MANUFACTURE OF GLASS ARTICLES.

1,393,118. Specification of Letters Patent. Patented Oct. 11, 1921.

Application filed January 15, 1919. Serial No. 271,223.

*To all whom it may concern:*

Be it known that I, ROBERT FREDERICK HALL, a subject of the King of Great Britain and Ireland, and residing at Ferndale, 45 Church road, Moseley, Birmingham, in the county of Warwick, England, have invented certain new and useful Improvements in the Manufacture of Glass Articles, of which the following is a specification.

This invention relates to machines for the manufacture of glass articles, and refers to a machine of the class in question which enables articles varying widely in nature and size to be produced in a more rapid and efficient manner than is the case with the apparatus at present in use.

In machines for forming glass articles by pressing alone, or by a combination of pressing and blowing, including the manufacture of narrow necked bottles, the parison is sometimes gathered by hand, sometimes by suction, and sometimes fed by a semi-automatic means from a flow. Some of the machines have single and some double circular tables, upon which the different molds are located, and the parison is naturally transferred by hand from one table to the other, where double tables are provided, that is from the parison molds on the one table, to the finishing molds on another table.

With this type of machine, the human element forming the link between the different operations introduces the risk of delay and of the production of defective articles, thus limiting the output of the machine, while the question of fatigue and skill adds a further determining factor; and the necessity of transferring the parison from one set of molds upon one table to another set of molds upon another table further introduces certain defects, such as undue cooling of the glass thus often producing inferior or defective articles.

Although so called "turn-over" machines have been proposed in which the transference of the parison from the parison mold to the finishing mold has been effected by purely mechanical means, these machines have also been found to work defectively in practice.

By my invention I overcome the objectionable features in the previous machines in the manner hereinafter described.

According to my invention I provide upon a suitable framework, two endless chains, an upper and a lower chain passing around sprocket wheels or their equivalents. The links of these chains are constituted by plates or platforms, and the chains are so mounted and operated that the platforms on the upper and lower chains travel along during a portion of their course opposite to and in close proximity to one another. Each platform of one of the chains for instance the lower chain carries the parison and or finishing mold, and other associated parts, for manufacturing the glass article while the corresponding platform on the other chain carries the corresponding portions of the molds, the blowing device, the plungers, and other associated parts for assisting in the manufacture of the article.

In the general way of carrying out my invention, I construct a machine in the form of an endless belt composed of a series of plates, each plate being hinged or linked to its corresponding plates, thus forming a chain of plates or platforms. This chain is caused to pass over suitably designed rollers or their equivalents so that when the two ends of the chain of plates are joined together and the end rollers are stretched apart from each other as far as they can be adjusted, a taut horizontal, endless belt or chain of plates is produced, which can be made to travel along presenting a series of flat platforms on the top side, which platforms when the device is in motion travel along and return underneath to re-present themselves in due rotation upon the top side.

The rollers or their equivalents may be constructed with flat faces or may have projections or depressions to engage into or with corresponding parts upon the individual plates or links, and they may be geared or driven so as to cause the traveling series of platforms to synchronize with the speed of feed or flow of the glass from the furnace.

Suitable guides and supports are provided to prevent the horizontal platforms from sagging and also to resist the pressure that has to come upon them during the process of pressing upon and closing the molds or the like, and other operations necessary during the manufacture of the glass articles. These guides or supports may also serve as the mediums, in coöperation with the side frames which carry the bearings for the rollers around which the endless chains of moving platforms travel, upon which are located suitable guides or projections, which act as cams or rails to operate levers, elevate or depress plungers, open or close molds, apply and remove blowing covers or other parts, and effect any other required operations which can be effected as the moving platforms pass the stationary cams, projections, rails, guides or the like.

The stationary parts may also cause the operation of valve levers or plungers or electric contacts may be operated by suitably arranged contacting projections located upon the traveling and the fixed parts, for bringing suitable electrically operated devices into action.

Each of the platforms is arranged to carry upon it a finishing mold and its associated parts.

The mold may in some cases be without a bottom, so that a parison mold may be pushed up through a hole in the platform and withdrawn when the parison is formed by the pressing operation, and a false bottom may be slid into place so as to complete the finishing mold, in which the blowing operation is then performed and the article completed.

When the traveling platform arrives at the end of its horizontal travel and turns over upon the roller or rollers at the end, it may open the mold automatically so as to discharge the finished article. The mold then returns, empty on the underside, where it is cooled by suitable means during the return journey.

As it mounts up around the rollers at the other end it receives the so called "gob" or mass of molten glass, suitable means being added for insuring that the glass shall pass into and be retained in the mold. The mold then reaches the upper horizontal path of travel and passes through the various processes, the article being delivered as before described as the mold passes around the roller or rollers at the other end previous to its return journey on the underside.

Elevated above the top side or upper horizontal platform carrying the molds, and preferably coming within the before mentioned wide frames, are another pair of rollers or their equivalents and another endless chain of corresponding platforms and these two of rollers are geared into or connected to the bottom rollers so that the two separate endless chains of platforms in any particular unit or series, are synchronized and travel in fixed relation to each other.

The upper traveling platform operates from the bottom horizontal plane of travel and carries mounted upon each platform the punch used for pressing the parison and for blowing after pressing, or it may simply carry a pressing apparatus when a pressed article is required without blowing.

The up and down action of the punch and the operations of the valves and other parts, are effected, in the preferred case by means of stationary guides, rails cams or the like, as previously described, with reference to the lower platform.

The number of molds and corresponding associated parts upon each of the two separate traveling platforms may be as many as desired, and the number may be equal upon each of the associated endless chains, or the top chain may be geared to the lower chain in such a way as to permit of one punch or one set of associated parts upon the upper chain serving two or three suitably located sets of associated parts upon the lower chain.

When the machine is set up against the glass furnace and supplied from a flow the mechanism regulating or cutting off the "gob" of glass may be so geared to the machine that the slowing down of the machine will give a bigger "gob" of glass and the quickening of the speed of the machine a smaller one by simultaneously allowing a longer or shorter interval of flow between the cutting off of the "gob."

I prefer to provide an independent means of separate adjustment in addition, for regulating the supply of glass to the mold, and as a result, so long as articles of the same weight are required, pressed work and pressed and blown work may be produced on my machine in a continuous series from a continuous flow without the introduction, hitherto necessary of a complicated system of intermittently operating apparatus for delivery and the inevitable missing of "gobs" leading to the production of cullet or waste.

In order that my said invention may be more clearly understood, I will now proceed to describe the same with reference to the drawings, accompanying this specification, which show by way of example one method of constructing a machine according to my said invention for the production of wide mouthed glass jars and a modified form of the machine for the production of narrow necked bottles.

Figs. 1$^A$ and 1$^B$ are diagrammatic fragmentary views which taken together constitute a complete side elevation with portions in section of a machine made according to the invention for the manufacture of bottles or jars with wide mouths.

Fig. 1$^C$ is a similar view on an enlarged scale showing the three central elements to illustrate the coöperation of the parts.

Fig. 2 is a transverse section in a plane, transverse to the machine and taken between portions V and VI looking toward the right in Figs. 1$^A$ and 1$^B$.

Fig. 3 is a fragmentary diagrammatic sectional side elevation of three coöperating elements in a modified form of the machine for the manufacture of bottles with narrow necks.

Fig. 4 is a transverse section of the machine fitted with this form of mechanism for manufacturing bottles with narrow necks.

Fig. 5 is a vertical section and Fig. 6 a plan of the device for feeding the compressed air to the blowing head.

Fig. 7 is a plan of three links of the chain to illustrate the arrangement of the finishing molds and bottom molds.

Figs. 8 and 9 are diagrammatic plans of two cam plates for use in connection with the blowing apparatus as hereinafter explained.

The same symbols of reference are employed to denote the same parts in all the views.

The machine is supported upon a rectangular framework comprising longitudinal members $a$ connected by transverse members $a^1$. This framework is provided with bearings $b$ through which pass the axles $c$ carrying the ordinary running wheels $d$ so that the machine can be easily moved to and away from the working position upon the rails $e$. Suitably bolted to the lower framework $a$, $a^1$ are the side frameworks $f$, which have been largely omitted in the drawings, in order to facilitate the showing of the inner parts, but these frameworks are of any suitable character for supporting the endless chains and associated parts.

Suitably mounted at the lower part of the principal framework are two pairs of large sprocket wheels $g$, $g$, provided with projecting teeth $g^1$.

The lower chain is mounted so as to be rotated by the wheels $g$.

This chain consists in the present case of plates $h$, provided with pivotal connections consisting of rods $h^1$, to which the plates $h$ are hinged, the ends of the rods $h^1$ projecting somewhat at $h^2$ and traveling in guide channels $f^2$ on the insides of the side frameworks $f$ in order to guide the chain in its passage and to support the plate $h$ when pressure is brought upon it.

The plates $h$ have bolted to them the finishing molds $k$. These finishing molds are provided with outwardly projecting lugs $k^1$ through which pass the bolts $k^2$, the arrangement being such that the bottom of the mold is supported by means of distance sleeves or the like at some little distance above the upper surface of the plate $h$.

The plate $h$ is provided at the center with a circular hole, somewhat larger than the bottom of the mold, and within this hole is fitted a bush $m$.

Slidable through this bush is the parison mold $p$, which is adapted to slide up into and fit loosely within the finishing mold $k$ or to be withdrawn from the interior thereof.

The mold $p$ is provided with an extension $p^1$, which is provided with a circular recess in which works a plunger $p^2$, a compression spring $p^3$ being interposed between the inner end of the plunger $p^2$ and the bottom of the recess in the extension $p^1$.

The end of the plunger $p^2$ is squared at $p^4$ and this portion carries pulleys or rollers $p^5$ which roll between rails $r$, these rails forming a camway by means of which the parison mold $p$ can be pushed up into or withdrawn from the interior of the finishing mold $k$, as hereinafter more fully explained.

$s$ is the bottom mold. This is mounted so that it is oscillatable upon one of the bolts $k^2$ and so that when in position below the finishing mold $k$, a projecting lug or the like opposite to the pivot comes against the opposite bolt $k^2$ and holds the mold $s$ in the correct position in register with the bottom of the mold $k$. It is also mounted so that it can slide upward for a short distance on the pivot $k^2$, so that the slightly convex portion of the top of the mold is enabled to pass and so that a tight joint is made when pressure is brought to bear upon the underside of the mold $s$.

In addition the mold bottom $s$ is provided with a projecting arm or the like between which and a stop $t$ carried by the plate $h$ is a compression spring $t^1$, which tends to keep the bottom plate or mold $s$ in the open position. Coöperating with the extension on the mold $s$ is one end of a bell crank lever $w$, the other end of which $w^1$ carries a pulley $w^2$ kept normally in contact with a rail $w^3$ constituting a camway, which is so shaped that at the required time the bottom mold $s$ is pushed around against the tension of the spring $t^1$ and brought into position beneath the mold $k$, see Fig. 7, while at other times the bottom mold $s$ is pushed out of the way, the cam part being so shaped that the compression spring $t^1$ is enabled to act.

Having dealt with the principal devices in connection with the lower chain of plates, I will now proceed to consider the upper chain of plates and the mechanisms carried thereby.

The upper chain of plates is carried and operated by sprocket wheels $g$ provided with teeth $g^1$ similar in character to those driving the lower chain.

$h^3$ are the plates, which are pivotally connected as explained with regard to the other chain by means of rods $h^1$ to which they are hinged, the rods $h^1$ forming the pivot pins having projecting ends $h^2$ working in channels $f^2$ upon the side frames $f$ of the machine.

Each of the plates $h^3$ is perforated at the center and provided with a bush 2.

Adapted to slide through the bush 2 is a sleeve 3. This sleeve is formed with a transverse extension provided at each end with tubes 4.

The outer faces of the tubes 4 are slotted for some distance at 5. Slidable in each of the tubes 4 is a rod 6 carrying a projecting pin projecting through the slots 5 and furnished at the end with a pulley or roller 7. 8 is a spring at the bottom of the tube 4 tending to push the rod 5 and consequently the roller 7 so that it tends to come into contact with the inner rail of two rails $r^1$, forming a looped cam path the object of the whole construction being to slide the sleeve to a certain extent through the bush 2, a certain amount of resiliency being allowed by the springs 8.

It will be seen from the left hand side of Fig. 2 that the plate $h^3$ is provided with a tubular channel $h^4$, having a downwardly turned orifice at $h^5$, and that the tubular channel $h^4$ corresponds with a perforation $h^6$ in the bush 2.

The sleeve 3 is also provided with a perforation 10 which in a certain position, as shown at Fig. 2, corresponds with the perforation.

Sliding within the sleeve 3 is a rod or core 11. This rod 11 is provided with an extension at 12, upon which slides a short sleeve 13. 14 is a compression spring interposed between a shoulder on the rod or core 11 and the sleeve 13. The sleeve 13 is provided at each side with pulleys 15 working between cam rails 16.

The other ends of the rod or core 11 is provided with a large perforation 17 extending axially up the rod and having a side opening 18 adapted to coincide with the hole 10 in one position of the rod 11, as shown at Fig. 2. The extremity of the perforation 17 forms a valve seating for a valve 19 the stem 20 of which passes up through the perforation 17 and a smaller perforation forming a continuation thereof to the other end of the rod or core 11. The rod 20 is provided with a nut 21, between which and the end of the rod or extension thereof 12 is a compression spring 22.

Pivotally connected to the flange 23 on the sleeve 3, by means of links 24 are the halves 25 of the neck or ring mold. These are so connected to the flange 23, that when they come into contact with the top of the finishing mold they are pressed inward, until they form a complete ring, suitable for molding the top of the neck of the bottle.

I will now proceed to describe the general operation of the machine, leaving the particular method of supplying the blowing air, illustrated in the drawing, to be described hereafter.

It will be observed that the number of plates on the upper chain is smaller than that on the lower chain. I prefer that the number of plates on the lower chain shall be a multiple of the number of plates on the upper chain, but this is not an essential feature of the invention.

The chains are driven by any suitable gearing so that they move synchronously either continuously or with an intermittent or step by step or graduating movement, whereby the motion of the links can be accelerated and retarded to meet the requirements of glass delivery in a clockwise direction and the upper chain passing around the left hand sprocket wheel in a contraclockwise direction.

It will be seen that as the plates on the lower chain rise the finishing mold comes around until it reaches the position I Fig. 1$^A$. In this position the parison mold $p$ is pushed up by the rod $p^2$, which in turn is pushed up from the rail $r$, and the parison mold is projecting up in the middle of the finishing mold $k$. When the machine reaches or stops in this position a suitable charge of glass is supplied through the shoot S into the mold.

At the next movement of the machine, the mold is brought along to the position II and it will be observed that the corresponding blowing head and the neck mold are approaching it on the upper chain. At the next movement of the machine, the parts reach the position III and as they come into this position the cam rails $r^1$ acting upon the rollers 7 cause the sleeve 3 to slide downward bringing the head down toward the corresponding finishing mold $k$.

As the parts travel along to the next position IV, the core 11 is forced downward, forcing down the lower end and the valve 19 and at the same time the neck mold 25 has closed around the top of the parison mold, the result being that the molten glass as shown in position IV is forced up around the lower end of the rod or plunger into the neck mold.

Furthermore, as the machine moves the parts from III to IV, the upper rail $r$ which curves downward causes the rod or plunger $p^2$ to move downward allowing the parison mold P to drop downward until its upper edge is below the general level of the upper surface of the plate $h$. Just after this the bell crank lever $w$ is operated from the roller $w^2$ so that the bottom plate or mold $s$ is swung around and comes below the mold $k$, just after this the parison mold P is pushed slightly upward, coming against the underside of the plate $s$, and causing a tight joint to be made between the bottom of the mold $k$ and the bottom mold $s$.

When the apparatus is in the position IV the plunger 11 rises but the valve 19 is slightly protruded and blowing air is admitted blowing the bottle or the like in the mold $k$.

The apparatus then moves into the position V and as it approaches this position the head is raised by the upper chain and the halves 25 of the neck mold separate and leave the top of the finished article. The parison mold P is also drawn downward, allowing the bottom mold $s$ to drop down, whereupon this mold $s$ is withdrawn through the pressure of the spring $t^1$ from beneath the mold $k$.

The chain then proceeds through position VI where the bottom $s$ has practically moved from beneath the mold, and when it reaches the position VI the parison mold P begins to push upward upon the bottom of the jar or bottle. This operation continues until as will be seen in the position VII, the article is being pushed out of the mold and finally shortly after the apparatus reaches the position VIII the finished article is pushed out and discharged on to a conveyer 26 from whence it may be conducted to the leer or annealing oven.

The operation continues in this way, the finished article being delivered with great rapidity as each head moves away and the corresponding finishing mold comes opposite the conveyer.

I will now examine the method which I employ for conducting the blowing air to each head in the upper chain, as it comes into the blowing position.

It will be remembered that each of the upper plates $h^3$ is provided with a channel $h^4$ which is adapted, when blowing is to take place to communicate through the apertures 10 and 18 and past the valve 19 with the interior of the article to be blown. I now propose to consider how the air is supplied to the aperture $h^5$.

Mounted at the side of the framework, so that it is rotatable about a vertical axis is the device by means of which the air is fed to each moving head in succession. This device comprises a central tubular column 27 near the top of which are mounted so as to rotate thereon, four tubular sleeves 28, at right angles to one another so as to form a cross, see Fig. 6. 29 are inner sleeves which are adapted to register in succession with an opening 30 at the side of the tubular column 27.

It will be seen that a space is left between the sleeves 28 and 29. Slidable within this space but normally pressed outward by means of compression springs 31 is a sleeve 32. Carried at the end of each of the sleeves 32 is a vertical tube 33, provided with a mouth piece 34 at the top and closed at the bottom, where it is provided with a conical roller 35. The inner portion of the tube 33 communicates with the interior of the sleeve 29, so that the air passing up the vertical column 27 can pass along the arm and into the mouth piece 34 along the sleeve 29.

On the underside of each plate is mounted a projecting device $h^7$, see Fig. 6, which is adapted to engage with the roller 35, and to draw it and the corresponding arm along, as the plate $h^3$ travels. This projecting device $h^7$ is provided with a beveled portion which causes a vertically upward push to be communicated to the tube 33, thus making a tight air seal, between the mouth piece and the aperture $h^5$. As the plate continues to travel the mouthpiece 34 is kept in the right position by the tube 32 telescoping inward against the outward push of the compression spring 31.

In order to cause this motion to take place in the correct manner, I provide mounted fixedly upon the framework a cam 36, which is shown in plan at Fig. 8. This cam is provided with a straight portion at 37, which is parallel with the line of direction of travel of the chain, see Figs. 5 and 6. Each of the tubes 32 is provided with a fitting 38, projecting through a slot at the bottom of the arm 28, and carrying a roller 39 working in the camway 36, so that as the arms of the device are drawn around, the mouthpiece is kept in the correct position to register with the holes $h^5$.

With this arrangement it will be seen that each of the projections $h^7$ will draw along the corresponding arm for a a certain distance and then leave it. In practice this would occur before the next arm was in a position to be engaged by the next following projection $h^5$, and to obviate this difficulty I provide means for causing the whole device to be rotated through a certain amount of arc each time that the projection $h^7$ releases the previous arm, in order to bring the next arm within the path of the next projection $h^7$.

To effect this with the apparatus under consideration, I mount, so as to rotate with the part of the fitting carrying the arms 28 a cam 40, shown detached at Fig. 9. This cam is so set that the steeply inclined portions are brought to a certain position, each time it is required to give the device a forward rotary push to bring the next arm into the position to be picked up.

To effect this push, the device shown in Figs. 5 and 6 is provided. This consists of a roller 41, carried at the ends of a rod 42 mounted in a fitting 43 and pressed toward the axis of rotation of the cam by a compression spring 44. As soon as the roller 41 passes one of the noses 45 of the cam the roller travels along the steep slope and pushes the device through an amount of arc as may be required.

Fig. 3 is a diagrammatic section illustrating three coöperating elements of a machine constructed according to a modified method of carrying out my invention, the machine being intended for the production of narrow necked bottles.

In this figure each of the lower plates $h$ is provided as before with a bush $m$, through which slides the parison mold $p$. The parison mold itself is in this case constituted by a tube, the movements of which are controlled from a sleeve $p^6$ as previously explained from a camway, a buffering spring $p^7$ being interposed.

Sliding within the tubular parison mold $p$ is a rod or plunger $p^8$, the movements of which are controlled from a sleeve $p^9$ from a camway, a buffering spring $p^{10}$ being interposed.

The construction of the parts carried by the upper plate $h^3$ is substantially the same as that already described, the halves 25 of the neck mold being however considerably deeper than those used in the other case.

With this construction the glass is fed into the open parison mold as previously explained in a position previous to that in which it is shown in Fig. 3. In the position II$^a$ which corresponds to the position of the mechanism shown at II, in Fig. 1$^A$, the parison mold P is at the top of its stroke inside the finishing mold $k$ and the halves of the neck mold 25 have been closed down around it.

As the machine moves on to the position III$^a$, the inner rod $p^8$ is pushed up. This forces up the glass into the neck mold and around the plunger.

As the machine passes on to the position IV$^a$, the parison mold $p$ and the plunger $p^8$ are both drawn down through the plate $h$, but the movement of these parts is so relatively timed that there is a certain stripping action, the rod pushing the parison out of the mold. As soon as the parison mold $p$ and the plunger $p^8$ have passed down, the bottom mold $s$ is turned into position beneath the mold $k$ and is pushed upward by the plunger $p^8$ coming against its underside, as previously explained with reference to Fig. 1. Blowing then takes place, and the other operations follow in sequence as already described with the other form of the machine.

It will be understood that the methods of constructing the machine hereinbefore described are merely given by way of example, as the construction may be varied largely to suit requirement without departing from the principle of my invention.

It will be understood that although the apparatus has been described with reference to horizontal chains, the chains may be arranged in other positions where found desirable. For instance, the chains may be so arranged that the articles are carried up or down an inclined path during the course of manufacture.

What I claim and desire to secure by Letters Patent of the United States of America is:—

1. A machine for the manufacture of blown glass articles comprising two endless carriers, one above the other and arranged to move in opposite directions, one of said carriers having a series of blowing heads and associated parts and the other carrier having a series of coöperating molds.

2. A machine for the manufacture of blown glass articles comprising two endless carriers, one disposed above the other and arranged to move in opposite directions, one of said carriers having a series of blow heads arranged thereon, means for controlling the admission of air to the blow heads, means for effecting the actuation of the blow heads, a series of coöperating finishing molds on the lower carrier, and parison molds on the lower carrier coöperating with the finishing molds and blow heads.

3. A machine for the manufacture of glass articles comprising a frame, a pair of endless carriers formed of a plurality of connected supports carried in the frame in such manner that the supports of one carrier will be positioned opposite to and move in synchronism with supports of the other during a portion of the travel of the carriers, a finishing mold on each support of one carrier, a parison mold adapted to operate through the bottom of the finishing mold, means for automatically operating the parison mold, upper mold sections on each supporting section of the other carrier and adapted to coöperate with the finishing molds during a portion of the travel of the carriers, and means for moving the upper mold sections into operative relation with the finishing molds when a supporting section of each carrier is opposite.

4. A machine for the manufacture of glass articles comprising a frame, a pair of endless carriers formed of a plurality of connected supports carried in the frame in such manner that the supports of one carrier will be positioned opposite to and move in synchronism with supports of the other during a portion of the travel of the carriers, a finishing mold open at each end on each support of one carrier and having the bottom thereof secured in spaced relation to the support, a laterally swinging bottom plate movable beneath the finishing mold, means for automatically operating said bottom plate at the proper positions during the travel of the carrier, a parison mold adapted to reciprocate through the bottom of the finishing mold, means for effecting the reciprocation of the parison mold when the bottom of the finishing mold is open, upper mold sections on each support of the other endless carrier, and means for moving the upper mold section into operative relation with the finishing mold during a portion of the travel when a support of each carrier is opposite.

5. A machine for the manufacture of glass articles comprising a frame, a pair of endless carriers formed of a plurality of connected supports carried in the frame in such manner that the supports of one carrier will be positioned opposite to and move in synchronism with the supports of the other during a portion of the travel of the carriers, a finishing mold on each support of one carrier, a parison mold adapted to operate through the bottom of each finishing mold, means for automatically closing and opening the bottom of each finishing mold, means for automatically operating the parison mold, upper mold sections on each supporting section of the other carrier and having blowing means in connection therewith, means for moving the upper mold sections into operative relation with the finishing molds during a portion of the travel when a support of each carrier is opposed, and means for admitting air under pressure to each upper mold section in succession as they are brought into operative relation with the finishing mold.

6. A machine for the manufacture of glass articles comprising a frame, a pair of endless carriers formed of a plurality of connected supports carried in the frame in such manner that the supports of the one carrier will be positioned opposite to and move in synchronism with the supports of the other during a portion of the travel of the carriers, a finishing mold on each support of one carrier, a parison mold adapted to operate through the bottom of the finishing mold, means for automatically closing and opening the bottom of the finishing mold, means for automatically operating the parison mold, upper mold sections on each supporting section of the other carrier and having blowing means in connection therewith, means for moving the upper mold sections successively into operative relation with the finishing molds during a portion of the travel when a support of each carrier is opposite, automatic means in the parison mold for pressing material into the upper mold section when the upper mold section first moves into operative relation with the finishing mold, and means for admitting air under pressure to each mold section successively during the time the upper mold sections are in operative relation with the finishing molds.

7. A machine for the manufacture of glass articles comprising a supporting frame, an upper and a lower elongated endless carrier supported in the frame and parallel to each other, said carriers having their opposite faces in proximity to each other during a portion of the travel, means for concomitantly moving said carriers in opposite directions whereby the opposed faces move together throughout a portion of their travel, a series of molding devices on the lower carrier comprising parison and finishing molds, a series of upper mold sections on the upper carrier and adapted to coöperate with the finishing and parison molds, and automatic means for operating the parison molds and upper mold sections for forming glass articles during the portion of travel when the finishing and upper mold sections are moved together in opposed relation.

8. A machine for the manufacture of glass articles comprising a supporting frame, an upper and a lower elongated endless carrier supported in the frame and parallel to each other, said carriers having their opposite sides in proximity to each other, means for concomitantly moving said carriers in opposite directions whereby the opposed faces move together throughout a portion of their travel, a series of finishing molds on the lower carrier, parison molds reciprocable through the bottom of each finishing mold, a cam for reciprocating each parison mold, an endless cam path in the frame for effecting the operation of said cams, a series of upper mold sections adapted to coöperate with the finishing molds during the portion of travel when they are opposed, a cam carried by each upper mold section for bringing it into operative relation with the finishing molds, and an endless stationary cam path for effecting the movement of the upper mold sections.

9. A machine for the manufacture of blown glass articles comprising a frame having two parallel elongated supporting carriers therein, and means for moving the carriers in synchronism in opposite directions, said carriers having their opposed faces in close proximity to each other, a series of lower mold sections on the lower carrier, corresponding mold sections on the upper carrier and adapted to coöperate with those on the lower carrier, air conduits leading into the upper mold sections, means for moving the upper mold sections into operative relation with the lower molds during a portion of the travel of the carriers when the mold sections are opposite and in close proximity, means adapted to travel parallel with the upper mold sections only during the time the upper sections are in operative relation with the finishing molds for delivering air under pressure to the upper mold sections in succession, and cam mechanism for effecting the operation of the air delivery means.

10. A machine for the manufacture of glass articles comprising a frame, sprockets in the frame, upper and lower elongated parallel carriers in the frame, said carriers comprising a plurality of interconnected supporting plates, said carriers having their opposed faces in proximity to each other, means for moving the upper and lower carriers in synchronism in opposite directions in such manner that each upper supporting plate will move opposite a corresponding lower supporting plate during a portion of the travel of the carriers, finishing molds on the lower plates, parison molds adapted to reciprocate into and out of the finishing mold, neck forming molds adapted to coöperate with the finishing molds while they are opposite each other, and means for reciprocating the parison mold into the finishing mold to receive the molten glass and to eject molded articles, said means acting at other times to hold the parison in retracted position.

In testimony whereof I affix my signature in presence of two witnesses.

ROBERT FREDERICK HALL.

Witnesses:
G. C. SALSBURY,
FLORRIE SMITH.